May 27, 1952 — G. L. POWNALL — 2,598,429
APPARATUS AND METHOD OF RAPID PRODUCTION AND HARVESTING OF ICE
Filed July 3, 1948 — 3 Sheets-Sheet 1
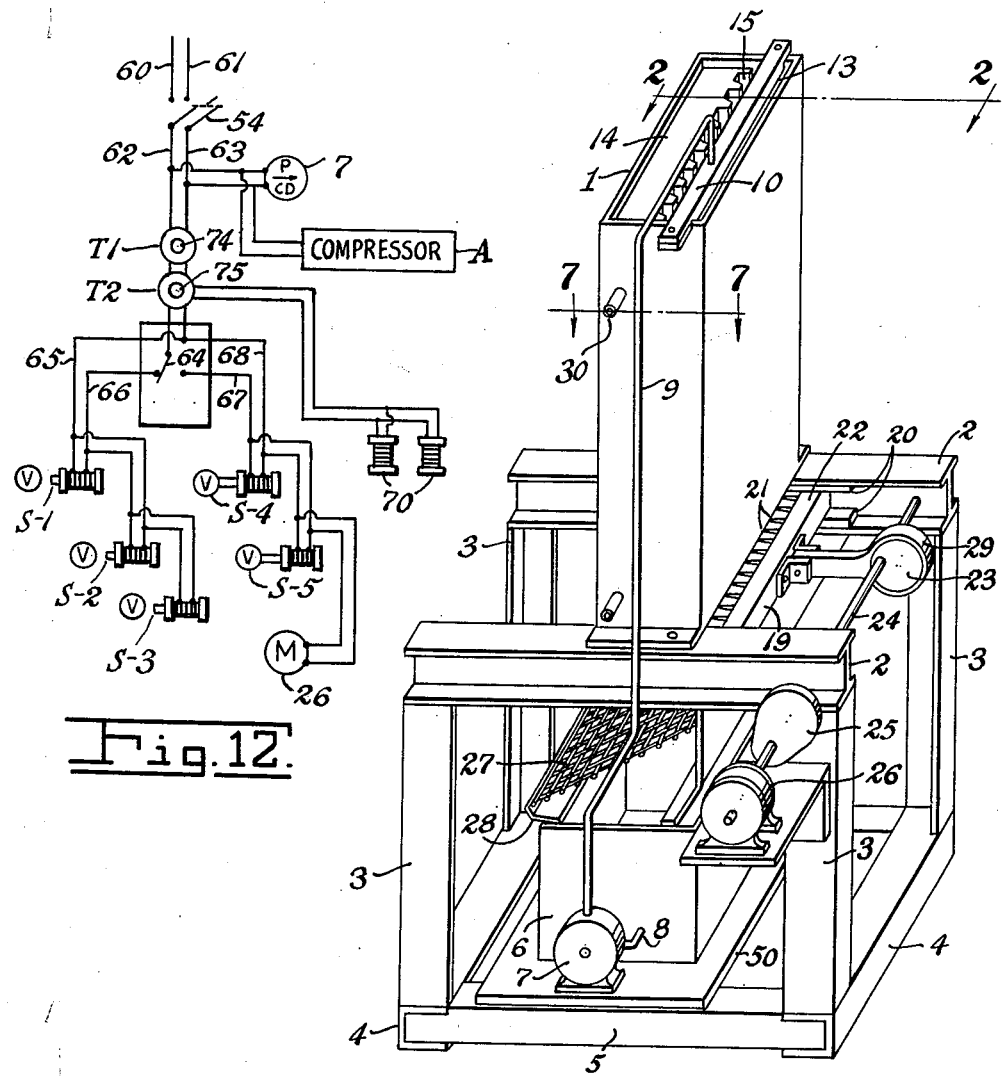
Fig.1.
Fig.12.
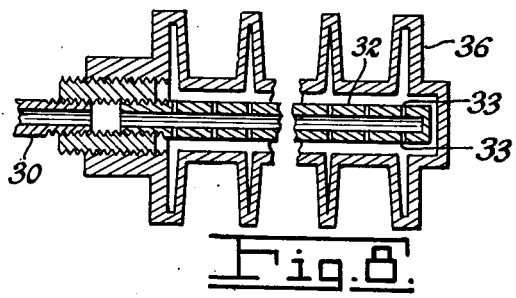
Fig.8.
INVENTOR.
GEORGE L. POWNALL
BY Zugelter & Zugelter
Attys.

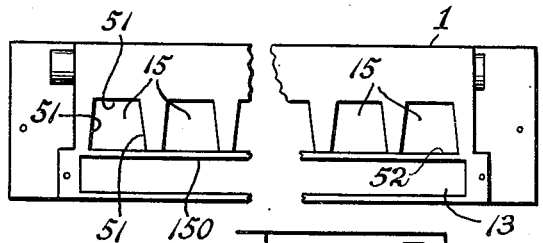
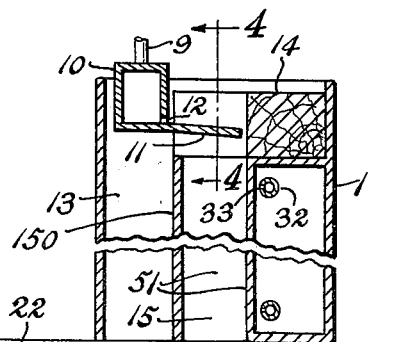
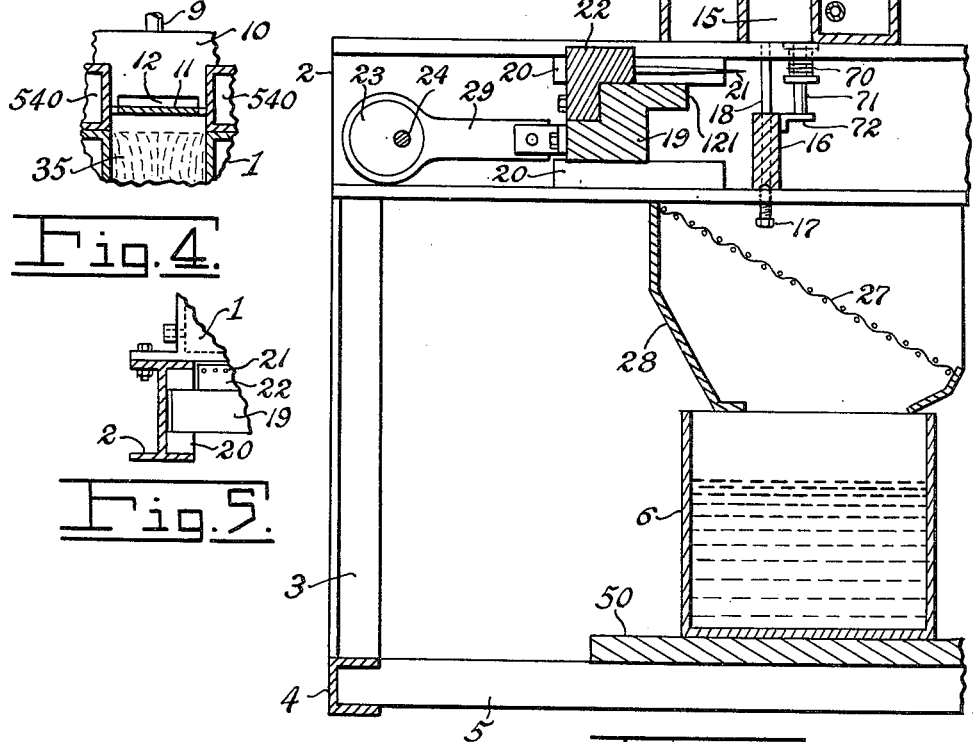
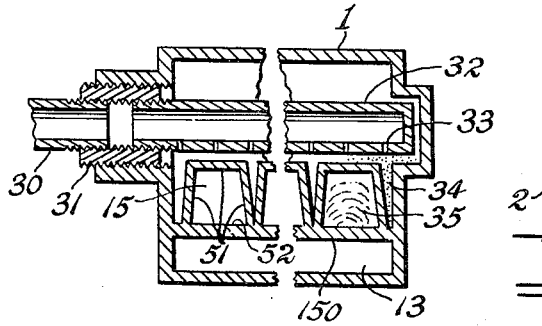

May 27, 1952 G. L. POWNALL 2,598,429
APPARATUS AND METHOD OF RAPID PRODUCTION
AND HARVESTING OF ICE
Filed July 3, 1948 3 Sheets-Sheet 3

INVENTOR.
GEORGE L. POWNALL
BY Zugelter & Zugelter
Attys.

Patented May 27, 1952

2,598,429

UNITED STATES PATENT OFFICE 2,598,429

APPARATUS AND METHOD OF RAPID PRO-
DUCTION AND HARVESTING OF ICE

George L. Pownall, London, Ohio

Application July 3, 1948, Serial No. 36,973

7 Claims. (Cl. 62—106)

This invention relates to an apparatus and method for automatic rapid production and harvesting of ice.

An object of the invention is to rapidly produce ice by mechanical refrigeration, in the form of elongate rods or sticks of clear ice to be sheared off progressively by automatic means, for producing ice particles in selected sizes or forms, as may be desired; that is, the ice may be sheared from the sticks as uniformly shaped masses, or as chips not uniformly shaped.

Another object of the invention is to provide a unique method of accomplishing the foregoing objective, and also appropriate apparatus therefore which is simple, compact, and economical in its operation, with maintenance costs reduced to a practical minimum.

Another object is to provide in an apparatus of the character referred to, effective and reliable means to produce clear transparent ice in stick or rod form, and to effect release of the sticks or rods for subsequent shearing thereof into particles of a desired character, with a substantial saving of power in cyclic operation of the apparatus.

Another and broader objective is to provide an improved method and means of cooling water or other liquid for any purpose.

These and other objects are attained by the means described herein and illustrated upon the accompanying drawings, in which:

Fig. 1 is a perspective view of the machine.

Fig. 2 is a vertical section of the same, as viewed from the rear of Fig. 1.

Fig. 3 is a top plan view of the evaporator, the distributing header being removed.

Fig. 4 is a fragmental cross-section taken on line 4—4 of Fig. 2, showing ice growth on the evaporator.

Figure 9:
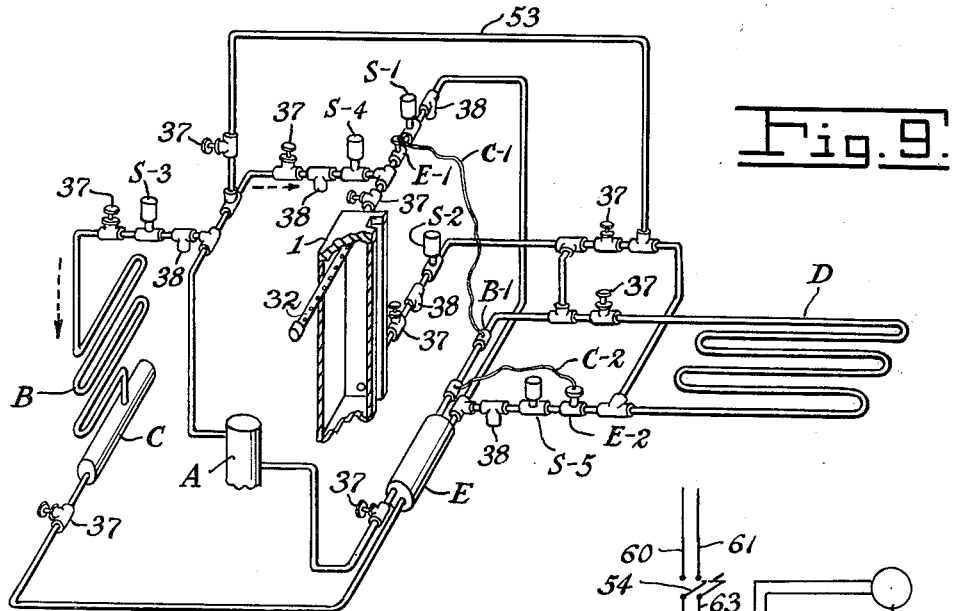

Fig. 5 is a broken-away section at the base of the evaporator, showing ice picks 21, crosshead 19, guides 20, and cutter head 22.

Fig. 6 is a broken-away elevational view of the ice stick limiting bar 16 and its guiding and adjusting means.

Fig. 7 is a fragmental enlarged cross-sectional view taken on line 7—7 of Fig. 1.

Fig. 8 is a fragmental cross-section of a modified form of volatile refrigerant distributor, somewhat similar to that of Fig. 7.

Fig. 9 is a layout of the refrigerant piping employed for full automatic operation of the machine, using a primary direct refrigerant which is volatile in character.

Figure 10:
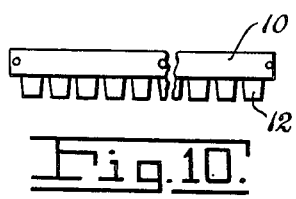

Fig. 10 is a top plan view, partly broken away, showing the water distributing header illustrated at 10—12 of Fig. 2.

Figure 11:
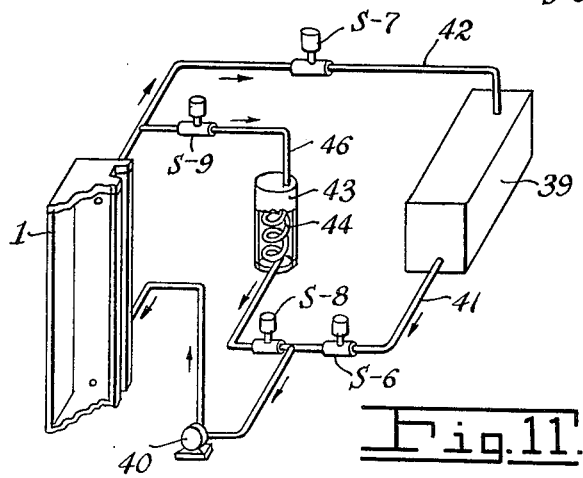

Fig. 11 is a piping layout showing the arrangement of elements employed for full automatic operation of the machine using brine as the refrigerant, and as the thawing agent.

Fig. 12 is an electric wiring diagram for the system of Fig. 9.

Figure 13:
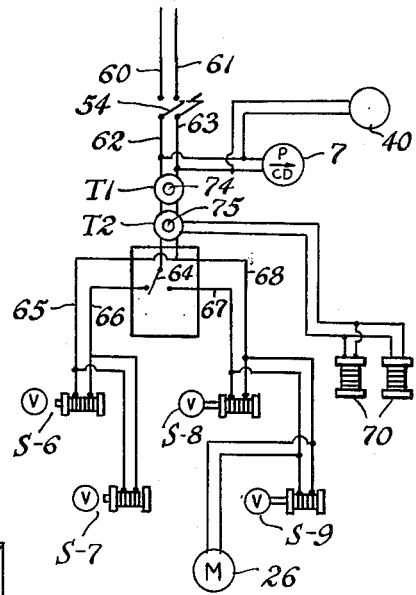

Fig. 13 is an electric wiring diagram for the system of Fig. 11.

Briefly described, the apparatus comprises an ice making machine including an evaporator and a freezing compartment arranged vertically to produce long sticks or rods of ice, which in cross-section may be substantially rectangular, cylindrical, or of other desired contour. The ice sticks or rods, after formation during a freezing period, are to be subjected to a brief thawing and releasing thereof from the walls of the shell of freezing compartment, whereby under the force of gravity or otherwise, the sticks or rods advance endwise onto a limit bar or stop, which supports them momentarily as a cutter or shearing means goes into operation for severing from the lower ends of the sticks or rods, a predetermined length of the latter. The limit bar or stop can be adjusted, either manually or by automatic means, to subject to the cutter or shear a substantial portion of the length of the ice sticks, or alternatively, a lesser portion thereof, depending upon the desire of the operator to produce ice cubes of the type generally used in cooling beverages, or ice chips such as might be desired for use in an ice cream freezer, for example.

The machine is cyclic in its operation to alternately freeze, and thaw slightly, the liquid undergoing treatment in the U-shaped ice molds associated with the evaporator, in accordance with the demands of a suitable timing apparatus. Certain other desirable features are incorporated in the machine and in the system as a whole, as will be pointed out in detail hereinafter.

It is to be noted that the complete ice making machine with most of its various inter-related parts are shown in the perspective Fig. 1, and primarily consists of a vertical hollow evaporator shell 1 resting on suitable base structure comprising I beams 2, vertical angle irons 3, and channel irons 4 spaced apart and strengthened by channel irons 5.

A base plate 50, secured to channel irons 5, furnishes a floor for water tank 6 and water circulating pump 7. At one end of water tank 6 is a float controlled water inlet (not shown)

for maintaining a constant height of water within the tank. The fresh water may come from any source available.

Water pump 7 takes water through suction line 8 from the water tank and discharges it through line 9 into a water distributing header 10 located on top of the apparatus. The water distributing header 10 has a narrow slit opening 12 (Fig. 4) along one face, and spaced plate-like aprons 11, which project outwardly from the header to coincide substantially with the somewhat similar U form of the evaporator shell (Figs. 2 and 4). As shown, the three side edges of the projecting apron are slightly spaced from the faces 51, thereby providing means to distribute water films against the faces 51 of the refrigerated surface, and to permit its flow downward by gravity. Such water as is not frozen into a growing ice rod drops into the aforesaid water tank 6.

Adjacent to, and abutting the evaporator shell U shape face, is a hollow space 13, one face 52 of which limits the outward growth of the ice rod. This hollow space may be constructed as an integral part of the evaporator structure or may be constructed as a separate apparatus and assembled with the evaporator.

Resting on top of the evaporator is an insulating member 14 of wood or other suitable material, of identical plan view shape as the evaporator. An alternate hollow metal member of this form is also indicated as 540 in Fig. 4 and whose purpose will be described hereinafter.

Directly under the multiple ice rod forming spaces is a cross bar 16 bearing on the inner webs of the I beams 2 and raisable by means of set screws 17, one at each end of the bar, to adjust the length of ice piece or cube to be cut off of the elongated ice rod. Stationary pins 18 one at each end of the bar provide for proper alignment of the bar which is slidable up and down on the pins. The pins are tightly fitted into the webs of the I beams.

Means for cutting off the elongated ice rods into cubes are provided directly under the evaporator and consists of a cross head 19 bearing in guides 20 within the webs of I beams 2. Properly spaced ice picks 21 mounted in cutter head 22 are bolted to crosshead 19.

The crosshead and cutter bar assembly is actuated in straight line horizontal movement by means of cam 23 mounted on shaft 24 driven through a speed reducing gear 25 by motor 26 mounted on the structural framework. The forward movement is transmitted by means of cam yoke 29 which is pivotally connected to crosshead 19.

Directly under the cutting mechanism is a wire mesh screen 27 to catch and direct away from the machine the cut ice cubes or chips to be collected in bags or baskets, are carried away by means of a conveyor, not shown. A light gauge metal splash guard 28 directs all dropping water into tank 6.

Thus it can be seen that water is circulated by the water pump from the water tank to the distributing header on top of the machine where it flows outward onto an apron which is slightly spaced from the wooden insulating member thereby causing a film to run downwardly on the channel-forming faces 51 of the evaporator to freeze into ice. This incremental growth of ice may be allowed to continue until spaces 15 are a solid mass of clear elongated ice rods extending the full depth of the vertical evaporator, and in width from the face of the evaporator shell to the stop plate 150 forming one wall of the hollow partition. The action of the flowing water causes clear ice to form in the well known manner.

If the tubular spaces 15 are permitted to fill with ice, the water then overflows the stop plate and continues to course down the stop plate on the inner side of the hollow partition; therefore when the ice is being thawed loose from the evaporator shell during the ice-releasing operation which will be further described hereinafter, the running water serves to act as a thawing agent in releasing the ice rods from the hollow partition.

It should be understood that the ice need not completely fill the spaces 15 before being released, as will be pointed out later.

The wooden insulating member on the top of the evaporator serves as a means to limit or stop any upward growth of ice above the evaporator. An alternate member would be a hollow metal member 540 of the same plan view shape as the evaporator, through which warm water could be circulated to release any part of ice rod that might adhere to the member above the evaporator. This warm water circulation would take place when the machine is in its automatic ice releasing operation, furthermore arrangement for thoroughly draining the interior of the member of water might also be provided to avoid any possibility of any water freezing therein when the machine is in its freezing operation.

The machine described herein constitutes the evaporator, water circulating system, cutting mechanism, and means and method of refrigeration and ice making in a new form which can be adapted into an existing plant wherein other normal appurtenances of a refrigeration plant are already available, such as compressors, motors, condensers, brine tanks etc. Or the application and use of this equipment and system may also be made up as a complete "packaged" self-contained automatic ice making plant, and is for use with either a primary refrigerant or a secondary refrigerant.

Novel means for the flow and efficient distribution of the volatile refrigerant is provided when the evaporator is for use with a primary refrigerant.

In Fig. 7 it will be noted that the volatile refrigerant such as dichlorodifluoromethane or ammonia enters as a liquid through liquid line 30, through bushing 31 into a distributing header pipe 32, said header being closed at one end and also provided with small spaced orifices 33 of approximately 1/8" diameter. These orifices are spaced so as to spray the liquid refrigerant against the inner faces of the evaporator shell. That portion of the liquid which immediately flashes into gas is readily removed, leaving the remaining liquid (approximately 85%) to course downward along the inner faces of the evaporator shell thereby wetting that surface for efficient heat transfer. As the liquid passes downward it also takes up heat from the evaporator wall and flashes into gas with the result that by the time the liquid has reached the bottom practically all of it has flashed into gas and has performed its efficient service in taking up heat given off by the water being frozen into ice on the outer face of the evaporator wall.

This novel means of refrigerant distribution is far more efficient than the old method of so-called "dry expansion," and is comparative in results with the so-called "flooded" operation, with the distinct advantage that a lesser volume of primary refrigerant is required than with the "flooded operation." Refrigerant liquid spray is indicated as 34 and the ice formation as 35 in Fig. 7.

An evaporator shell 36, provided for freezing elongated ice rods on two opposed major walls of the shell is shown in Fig. 8, and can be used in any number as inner sections in connection with separate hollow partitions in building up a machine capable of freezing larger tonnages of ice. Or, for example, the machine may consist of two of the outer shells (one right hand and the other left hand) as shown in Fig. 7 together with one of the double faced shells (Fig. 8) efficiently fastened together to form a machine.

One of the objects of this invention is the provision of means and method of manufacturing clear ice cubes automatically, and such a refrigerant piping lay-out to accomplish these results is shown in Fig. 9. An electric wiring diagram for this purpose is shown in Fig. 12, as representative.

The core of the automatic operation is through timers T1 and T2 either of which can be manipulated to regulate a freezing operation and a succeeding alternate thawing (and cube cutting) operation in continuous cycles by means of opening and closing solenoid controlled valves, and starting and stopping the motor that operates the cutting means. The compressor A and water pump 7 are in continuous operation.

In addition to the compressor A, other components of the usual refrigeration system are indicated as, condenser B, receiver C, and evaporating coils D in either an ice storage compartment or ice storage room. In addition, when dichlorodifluoromethane is used as a primary refrigerant a heat exchanger or accumulator E is also used in the suction gas line to boil off into gas any liquid refrigerant returning through the suction line en route from the evaporator to the compressor.

To place the machine in automatic operation for producing cubes of ice, a main line switch 54 (Fig. 12) is used to close the electrical circuit, thereby starting the compressor A and also water pump 7. The central push-button of timer T1 should then be depressed to place the system under the control of that timer. The timed switch 64 would then energize and open solenoid valves S1, S2, and S3, thereby causing flow of the liquid refrigerant from the receiver C through the heat exchanger E, through a thermostatic expansion valve E1, into the liquid header 32 (see Fig. 9) inside the top of the evaporator shell 1, the resulting evaporated refrigerant gas then passes from the evaporator shell at the bottom through the heat exchanger and back to the compressor A, where it is compressed and discharged through open solenoid valve S3 into the condenser; after liquifying the liquid then passes into the receiver C, its starting point. All other solenoid valves in the system remain closed during this freezing operation. The flow of the liquid refrigerant through the thermostatic expansion valve E1 is controlled in amount according to needs as registered in superheat by a bulb B1 located on the suction line and connected to the thermo valve E-1 by means of a capillary tube C1. The operation of this type of valve is well understood by those well versed in the trade.

Obviously, the time required to freeze the multiple ice rods will be governed by the temperature maintained in the evaporator shell. For purpose of description herein we may assume that it is 45 minutes, therefore the time switch T1 will be set accordingly for the freezing cycle; however it must be understood that any time setting can be made adjustable.

When the time switch reaches the end of this setting it then de-energizes the above indicated solenoid valves causing their respective closure, thereby stopping that circuit of the refrigerant for the freezing operation. At the same time it will energize and open solenoid valve S4 permitting hot gas to pass through the discharge line as indicated by → into the evaporator shell thereby warming the surface of same to release the ice rods therefrom. In the meantime water from the water pump will be overflowing the ice rod into the adjacent hollow partition space, thereby running down one face thereof to release the ice rod from that surface.

At the same time, solenoid valve S5 is opened thereby permitting liquid to pass through thermostatic expansion valve E2 into a secondary coil D located in the ice storage cabinet, thereby providing two services, i. e., refrigerating the ice storage, and also furnishing necessary refrigerant for compression as hot gas to warm up the evaporator wall to release the ice rods. Also at that same time the motor 26 operating the cutting mechanism will be started. Thermostatic expansion valve E2 likewise has a bulb B2 located on the suction line connected through capillary tube C2 to control its action.

When the ice rods are thawed loose from the evaporator and hollow partition, they drop down onto bar 16, which has been adjusted in height to give the proper length of cube desired. The cutting mechanism which has also been put in operation by the time switch cuts them off into cubes, and lip 121 pushes the resulting cubes off of the bar 16 onto the wire mesh screen 27.

The thawing-releasing, and cutting operation does not consume much time, perhaps 15 minutes, therefore the time switch setting will be accordingly; however as previously stated the setting on either operation is adjustable. Consequently when this latter operation is completed the time switch will again alter the circuits and start another freezing operation.

During the thawing-releasing cycle of operation the evaporator shell 1, having been temporarily serving as a condenser, may have a small amount of liquid refrigerant accumulated in its base which may run out into the suction line when another cycle is started by the initiation of the freezing operation. Accumulated liquid refrigerant is transferred to the heat exchanger or accumulator E upon the initiation of the cycle in order to prevent possible damage to the compressor that might be caused by excessive liquid return. During the initial stages of the new freezing cycle, element E containing the liquid refrigerant temporarily serves as a flooded type evaporator until such time as all of the liquid refrigerant contained in the shell has been boiled off into gas by the operation of the compressor thereby disposing of any small amounts of liquid refrigerant which originally accumulate in the evaporator during the thawing-releasing cycle.

Ordinary refrigerant hand stop valves 37 are located throughout the system for use when repairs are being made. Likewise a hot gas line as indicated by 53 and with ordinary hand stop valves are included in the refrigerant piping lay-out for defrosting the secondary coils D manually when necessary. Refrigerant fittings 38 with mesh screens therein are also included in the lay-out to protect the seats of the various automatic valves from scale etc.

Fig. 11 shows the refrigerant piping lay-out when the machine is for automatic operation with brine as the refrigerant.

Cold brine is taken from brine tank 39 by means of brine pump 40 through suction line 41, and discharged into the evaporator shell 1 at the bottom. Circulating through the evaporator where it picks up the heat given off by the water being frozen on the outer face of the evaporator wall it then flows through line 42 to be dumped back into the main cold brine tank 39, for re-cooling by other means not shown. Brine pump 40 is in continuous operation, both during the freezing and thawing operation.

On the above cold brine suction line 41 is solenoid controlled valve S6, and on discharge line 42 is another solenoid controlled valve S7.

This brine flow circuit is maintained throughout the freezing operation according to the time setting of the time switch T1. At the end of the freezing operation the time switch de-energizes solenoid valves S6, and S7 causing their closure, and at the same time energizes solenoid control valves S8, and S9 causing them to open, and also starts the cutting mechanism motor, (see Fig. 13).

The character 43 indicates a fresh warm water tank in which fresh water from any source available is maintained at constant height by means of a float valve (not shown). The water in this tank will flow directly to water tank 6 located under the machine as needed to maintain a constant height in tank 6. Within water tank 43 is located brine coils 44 which in connection with lines 45 and 46, brine pump 40, and evaporator 1 form a closed circuit hereinafter known as the warm brine circuit.

When solenoid valves S8 and S9 are opened, the brine pump then receives its brine through suction line 45 connected with coils 44, and then discharges the brine into the evaporator. After leaving the evaporator the brine flows through line 46 which is also connected to coils 44.

This circuit causes the brine to pick up heat from the water in tank 43, warming itself sufficiently to thaw and release the ice rods from the outer face of evaporator shell 1.

This circuit is also doing the double duty of cooling relatively warm water in tank 43 which will be used for ice making after its passage into tank 6. The operation of cutting the cubes and the alternate freezing and releasing operations in cycles are the same as described previously. The only structural difference in the evaporator of Fig. 11 is that when a brine system is used, there is no header such as 32 within the evaporator.

With further reference to the stop bar 16 of Fig. 2, it will be understood that by adjusting the bar upon its guide means 18 to different elevations, the amount of ice to be struck from the lower ends of the ice sticks by the picks or cutters 21, may be varied. Manual means in the form of adjusting screws 17 is illustrated upon the drawings for this purpose, along with suitable power means such as solenoids 70 or other motor devices adapted to automatically elevate the bar under certain operating conditions to be explained.

In the wiring diagrams of Figs. 12 and 13, the line wires are indicated at 60 and 61, and the load wires 62 and 63 are seen to supply current to the various electrical elements in a most conventional manner scarcely necessary to explain. The timed switch 64 in each instance is adapted to close and open the circuits 65—66 and 67—68, in alternation, through selected time intervals established by one or the other of the timers T1 and T2. The timers may include central push-buttons as shown, to be manually depressed by the operator of the machine, depending upon whether the machine is to produce cube ice or chipped ice. In the previous explanation, the production of cube ice was assumed, and such production was initiated by depressing the push-button of timer T1, to place the system under the control of that timer.

To produce chipped ice, the operator need only depress the push-button of timer T2, so as to place the switch 64 under the control of timer T2, which has a different setting than timer T1. In other words, timer T2 serves to operate the switch 64 at shorter intervals of time than timer T1. As a result of the shorter time period mentioned, the ice machine will operate to produce incomplete or partially formed ice rods or sticks within the molds 15, and these partially formed rods or sticks will be released onto the stop bar 16 in the form of ice channels of general U-shape, which are very easily disintegrated by the picks 21.

It is desirable, when producing chipped ice, to maintain the stop bar at a higher elevation than is illustrated by Fig. 2, and this may be accomplished automatically by energizing the solenoid coils 70 at opposite ends of the stop bar, for lifting the bar through the agency of the armatures or cores 71 which are attached to the bar by means of brackets 72. As the wiring diagrams of Figs. 12 and 13 indicate, the solenoids 70 are under the control of the timers T2 only, so that they are energized only in the course of chip ice production. When the machine is operated under the control of timer T1, no energization of solenoids 70 is possible, and therefore the stop bar 16 will remain in the lowered position for use in producing cube ice.

It will be understood from the foregoing, that the machine can be operated under the control of timer T1 to produce cube ice, or alternatively, it can be operated under the control of timer T2 to produce chipped ice. Timer T1 accordingly will be set to keep the machine in operation for a sufficient period of time to ensure the formation of solid ice sticks within the molds before initiating the thawing and releasing period. On the other hand, timer T2 will be set to provide a more rapid cycle of freezing and thawing, which is more economical and expeditious to the production of chipped ice.

In view of the foregoing explanation, it will be apparent that the same ice machine can be operated to produce ice cubes, or chipped ice, at the will of the operator. The selection is made simply by depressing the central push-button 74 or 75 of the proper timer.

What is claimed is:

1. In ice making apparatus, an evaporator which comprises an enclosed hollow shell having at least one substantially vertical wall, said wall having vertically extending corrugations forming spaced vertical channels of U-shaped cross-section, a plate abutting outer edges of the corrugated wall forming a plurality of channel-shaped mold spaces between the plate and the corrugated wall, each mold space being open at the top and bottom, means for introducing a refrigerant into the shell to contact the inner side of the corrugated wall, means for removing the refrigerant from the shell, and means for introducing water into the open tops of the mold spaces to flow down the spaces and congeal as ice on the outer side of the corrugated wall.

2. Ice making apparatus in accordance with claim 1 characterized by the fact that the means for introducing refrigerant into the shell is a spray head disposed within the shell and adapted to spray volatile liquid refrigerant on the inner surface of the corrugated wall adjacent the top thereof to flow down the corrugated wall opposite the water.

3. In ice making apparatus, an evaporator which comprises an enclosed hollow shell having at least one substantially vertical wall, said wall having vertically extending corrugations forming spaced vertical channels of U-shape in section, a spray head disposed within the shell and adapted to spray volatile liquid refrigerant on the inner side of the corrugated wall adjacent the top thereof, the refrigerant flowing downwardly in contact with the inner side of said corrugated wall, means for flowing water down the channels on the outer side of the shell to congeal as ice thereon, and means for removing the refrigerant from the shell.

4. An ice making apparatus which comprises an evaporator having an enclosed hollow shell provided with at least one substantially vertical wall, said wall having vertically extending corrugations forming spaced elongated substantially straight vertical channels of U-shaped cross-section, means for introducing a refrigerant into the shell and directing the same against the inner side of the corrugated wall, means for removing the refrigerant from the shell, means for flowing water down the channels on the outer side of said vertical wall, said water being congealed, as ice thereon by said refrigerant, means for heating the inside of said wall while the ice is congealed thereon to release the ice and cause it to descend said channels, a stop member disposed below said channels and adapted to arrest the descent of the ice, and a sharp edged ice pick mounted to reciprocate horizontally in a plane spaced between said stop member and the lower end of said channels to chop the ice into small particles.

5. Ice making apparatus in accordance with claim 4 characterized by the fact that the stop member is vertically adjustable between a lower ice block making position and an upper ice chip making position, and that means are provided for holding the stop member at each of said positions.

6. Ice making apparatus which comprises an evaporator having an enclosed hollow shell provided with at least one substantially vertical wall, said wall having vertically extending corrugations forming spaced elongated substantially vertical substantially straight channels of U-shaped cross-section, means for introducing a refrigerant into the shell and directing the same against the inner side of the corrugated wall, means for removing the refrigerant from the shell, a thermally insulated member mounted on the top of said wall, said member having a vertical face flush with and extending upwardly from the outside of said wall, and means for directing water against said face of said member to flow down the channels on the outer side of the shell, said water being congealed as ice thereon by said refrigerant.

7. Ice making apparatus which comprises an evaporator having an enclosed hollow shell provided with at least one substantially vertical wall having vertically extending corrugations forming spaced elongated substantially straight vertical channels of U-shaped cross section, means for introducing a refrigerant into the shell and directing the same against the inner side of the corrugated wall, means for removing the refrigerant from the shell, a thermally insulated member mounted on the top of said wall, said member having a vertical face flush with and extending upwardly from the outside of said wall, an apron member spaced a short distance from and extending downwardly toward said face of said member, and means for directing water onto said apron to flow down said apron onto said face and down the channels on the outer side of the channel, said water being congealed as ice thereon by said refrigerant.

GEORGE L. POWNALL.

REFERENCES CITED

The following references are of record in the file of this patent:

UNITED STATES PATENTS

| Number | Name | Date |
| --- | --- | --- |
| 1,267,795 | Ophuls | May 28, 1918 |
| 1,804,603 | Gedeon | May 12, 1931 |
| 1,934,371 | Muffly | Nov. 7, 1933 |
| 2,200,424 | Kubaugh | May 14, 1940 |
| 2,280,320 | Taylor | Apr. 21, 1942 |
| 2,288,003 | Kleucker | June 30, 1942 |
| 2,393,387 | Lee | Jan. 22, 1946 |
| 2,396,308 | Williams | Mar. 12, 1946 |
| 2,397,347 | Grumer | Mar. 26, 1946 |